(12) United States Patent  (10) Patent No.: US 8,375,717 B2
Lourenco et al.  (45) Date of Patent: Feb. 19, 2013

(54) METHOD TO PRE-HEAT NATURAL GAS AT GAS PRESSURE REDUCTION STATIONS

(76) Inventors: Jose Lourenco, Edmonton (CA); MacKenzie Millar, Edmonton (CA)

( * ) Notice: Subject to any disclaimer, the term of this patent is extended or adjusted under 35 U.S.C. 154(b) by 905 days.

(21) Appl. No.: 12/519,361

(22) PCT Filed: Dec. 14, 2007

(86) PCT No.: PCT/CA2007/002296
§ 371 (c)(1),
(2), (4) Date: Jun. 15, 2009

(87) PCT Pub. No.: WO2008/071008
PCT Pub. Date: Jun. 19, 2008

(65) Prior Publication Data
US 2010/0043439 A1  Feb. 25, 2010

(30) Foreign Application Priority Data
Dec. 14, 2006  (CA) ..................... 2572932

(51) Int. Cl.
*F01K 1/00* (2006.01)
*F01K 25/02* (2006.01)
(52) U.S. Cl. ............... 60/643; 60/645; 60/650
(58) Field of Classification Search ............ 60/517, 60/643, 645, 670, 650
See application file for complete search history.

(56) References Cited

U.S. PATENT DOCUMENTS

| 4,418,530 | A | 12/1983 | Bodrov |
| 5,425,230 | A | 6/1995 | Shpak |
| 5,799,505 | A | 9/1998 | Bonaquist |
| 6,138,473 | A | 10/2000 | Boyer-Vidal |
| 6,286,315 | B1 * | 9/2001 | Staehle .......................... 60/649 |
| 6,378,330 | B1 | 4/2002 | Minta |
| 6,581,409 | B2 | 6/2003 | Wilding |
| 6,606,860 | B2 * | 8/2003 | McFarland ..................... 60/648 |
| 6,739,140 | B2 | 5/2004 | Bishop |
| 6,751,985 | B2 | 6/2004 | Kimble |

FOREIGN PATENT DOCUMENTS

| CA | 2 422 893 A1 | 4/2003 |
| CA | 2 467 338 A1 | 7/2003 |
| CA | 2 515 999 A1 | 9/2004 |
| CA | 2 552 366 A1 | 7/2005 |
| DE | 44 16 359 A1 | 11/1995 |
| EP | 0 566 285 A1 | 10/1993 |
| EP | 0 635 673 A1 | 1/1995 |
| FR | 2 420 081 A1 | 10/1979 |
| GB | 2 103 354 A | 2/1983 |
| JP | 3-236589 A | 10/1991 |
| RU | 2 180 420 C2 | 3/2002 |
| WO | 94/11626 A1 | 5/1994 |
| WO | 03/081038 A1 | 10/2003 |

* cited by examiner

*Primary Examiner* — Hoang Nguyen
(74) *Attorney, Agent, or Firm* — Christensen O'Connor Johnson Kindness PLLC

(57) ABSTRACT

A method to pre-heat gas at gas Pressure Reducing Stations. A first step involve providing at least one electrical line heater having a flow path for passage of natural gas through electrical heating elements. A second step involves passing the high pressure cold natural gas stream along electrical heating elements and heating it up before de-pressurization. A third step involves the expansion of the high pressure heated gas in a enclosed vessel that houses a gas expander and power generator. The expansion of the gas generates shaft work which is converted into electrical power by the power generator and the expanded low pressure gas cools the power generator. This process results in the recovery of energy to replace the slipstream of natural that is presently used to pre-heat gas at Pressure Reduction Stations.

2 Claims, 4 Drawing Sheets

METHOD TO PRE-HEAT NATURAL GAS AT GAS PRESSURE REDUCTION STATIONS

FIELD

The present invention relates to a method of pre-heating natural gas at gas Pressure Reduction Stations.

BACKGROUND

In gas Pressure Reduction Stations, the gas is pre-heated before the pressure is dropped to prevent the formation of hydrates which can cause damage to the pipeline and associated equipment. The typical pressure reduction varies between 400 to 900 PSIG (pounds per square inch gage) for main transmission gas lines to local distribution lines and from 50 to 95 PSIG from local distribution lines to consumers. When gas is depressurised the temperature drops. The rule of thumb is that for every 100 pounds of pressure drop across a pressure reducing valve the gas temperature will drop by 7 F. When the pressure is reduced by the use of an expander, the temperature drop is greater because it produces work. The heat required to prevent formation of hydrates is normally provided by hot water boilers, gas fired line heaters or waste heat from; gas turbines, gas engines or fuel cells. In some stations, due to its large volumetric flows and pressure drops, energy can be and is recovered, by a combination of gas expander and boiler. For a more efficient recovery, combinations of gas expanders with CHP processes (Combined Heat and Power) or CCHP (Combined Cooling Heat and Power) processes are possible. The limitation in these applications are the economics which are driven by flow volumes, pressure delta, seasonal volumetric flows and 24 hour volumetric flows. Because of so many variables that impact on the economics of adding a gas expander be it with: a boiler, CHP or CCHP the current gas pipeline operators choose to pre-heat the gas by the use of boilers and or heaters.

SUMMARY

There is provided a method to pre-heat the gas before pressure reduction to prevent the formation of hydrates. This method eliminates the present practice of using natural gas as a fuel for; boilers, heaters, gas turbines, gas engines or fuel cells to pre-heat the natural gas before pressure reduction. Moreover, the present invention provides the ability to recover most of the energy available for recovery at pressure reduction stations. A first step has at least one line heater, with a first flow path for passage of incoming high pressure cold gas that passes through coils heated by electricity, the heated gas then enters an enclosed vessel. A second step involves passing the high pressure heated gas stream a through an enclosed vessel that houses both; a gas expander and a power generator. The high pressure heated gas expands in the gas expander, generating shaft work and a drop in temperature. The shaft rotates a power generator producing electricity and the lower pressure colder gas flows around the power generator before exiting the enclosed vessel. The objective being to keep the power generator cooler and accordingly to increase its efficiency. The third step involves the use of the generated electricity as a heat source to the electrical heater upstream of the vessel housing the gas expander and power generator.

BRIEF DESCRIPTION OF THE DRAWINGS

These and other features will become more apparent from the following description in which reference is made to the appended drawings, the drawings are for the purpose of illustration only and are not intended to in any way limit the scope of the claims to the particular embodiment or embodiments shown, wherein:

DETAILED DESCRIPTION

Figure 1:
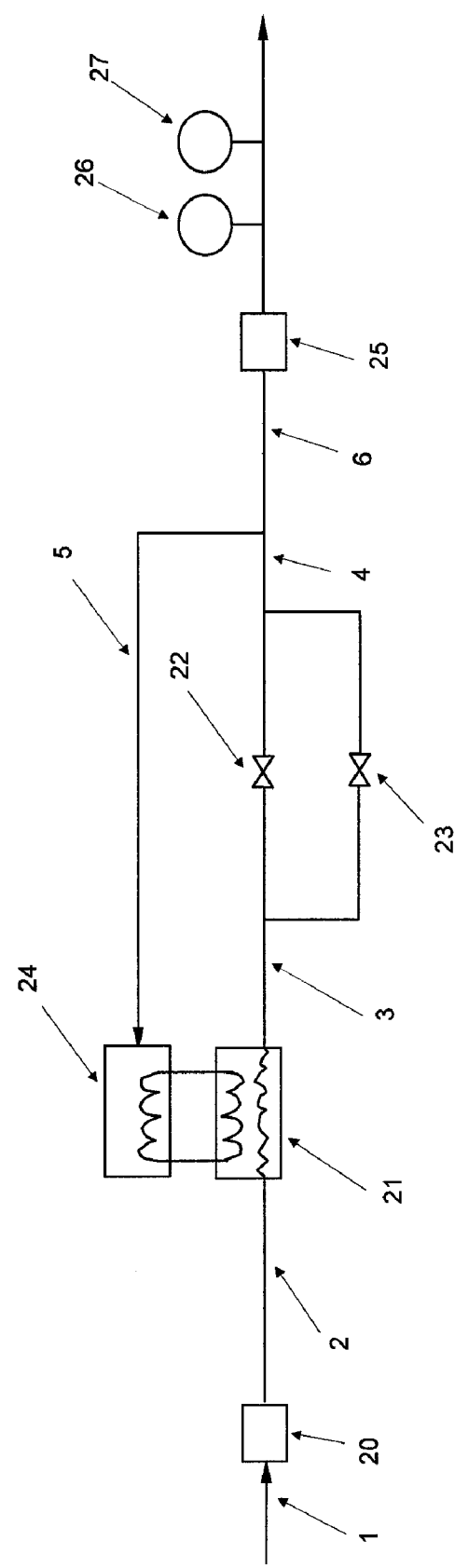
FIG. 1 labelled as PRIOR ART is a schematic diagram of a typical method to pre-heat gas at gas Pressure Reduction Stations (PRS).

The typical Prior Art method that presently is used to pre-heat natural gas at Pressure Reduction Stations will now be described with reference to FIG. 1.

In this typical gas pre-heating process, gas enters a station via gas supply line 1. The gas stream enters filter 20 to remove any debris in the stream. The filtered gas exits the filter through line 2 and enters heat exchanger 21 for pre-heating. The heated gas exits through line 3 and the pressure is reduced at Pressure Reducing Valve (PRV) 22. A by-pass with PRV 23 is provided for service reliability, for scheduled and unscheduled maintenance. The PRV pressure is controlled by Pressure Transmitter (PT) 27 at a pre-set pressure. The low pressure controlled gas stream 4 feeds a gas slipstream 5 for combustion in a heater/boiler 24. The gas slipstream flow 5 is controlled by Temperature Controller (TC) 26 at a pre-set temperature. The gas stream 6 is metered at Flow Meter (FM) 25 and delivered to consumers.

Figure 2:
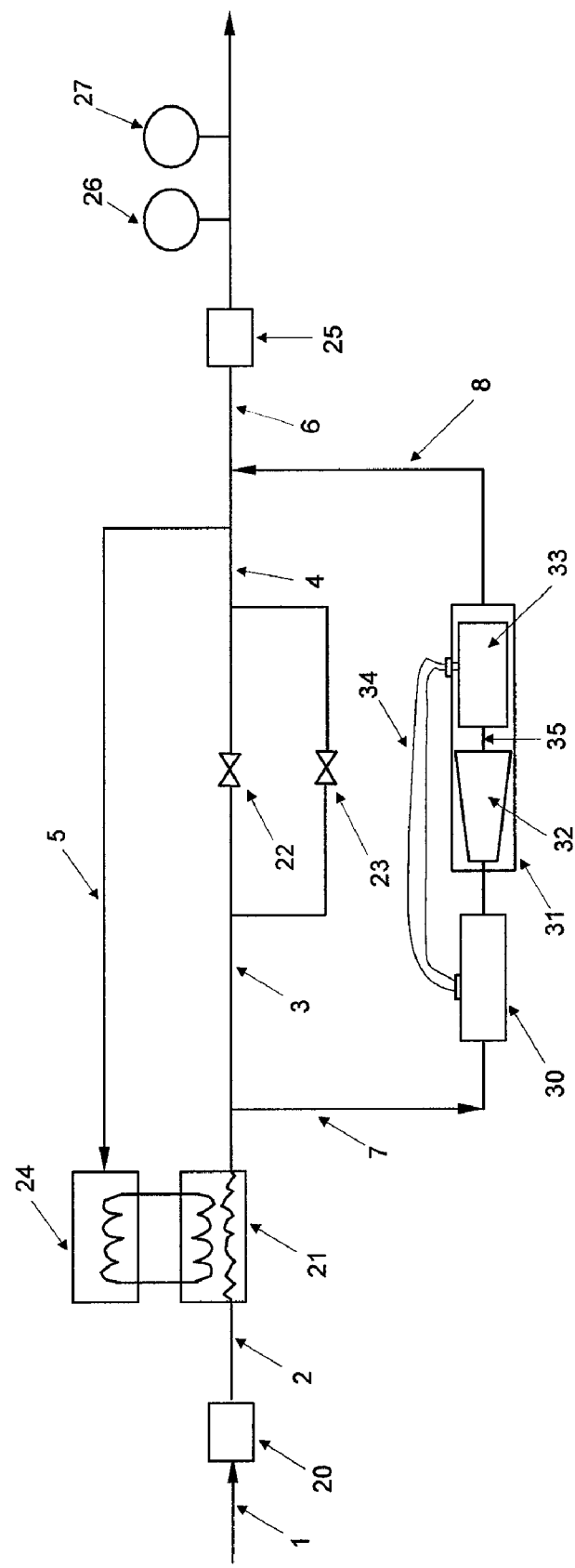
FIG. 2 is a schematic diagram that depicts an embodiment of the method to pre-heat natural gas at Gas Pressure Reduction Stations.

The preferred embodiment will now be described with reference to FIG. 2. In the preferred embodiment, the gas enters a station through supply line 1. The gas stream enters filter 20 to remove any debris in the stream. The filtered gas exits filter 20 through gas line 2 and passes through standby heater 21. Heater 21 is typically off-service and can be used as a standby heating unit. The high pressure cold gas stream 7 enters electrical heater 30 for pre-heating. The electricity is supplied by power generator 33. The high pressure heated gas enters housing vessel 31. The high pressure gas is first expanded in gas expander 32, producing shaft work and a drop in gas temperature. A shaft 35 rotates power generator 33, producing electricity. The produced electricity is carried by electrical wires 34 to electrical heater 30.

The low pressure cold gas flows by power generator 33 keeping it cooler, resulting in an increment in power generator efficiency and moderately pre-heating the gas exiting enclosed vessel 31 through stream 8. The low pressure gas enters FM 25 and is delivered to consumers.

The preferred embodiment has the advantage over the present practice in that it substantially reduces and or eliminates the use of a gas slipstream to pre-heat the gas prior to de-pressurization. This is significant when one considers that it can replace existing PRVs (known in the industry as JT valves) and line heaters. Associated with it is the reduction or elimination of emissions presently generated in these line heaters. Moreover, the energy used to replace the slipstream gas is recovered energy (no new emissions generated) which presently is dissipated across a PRV.

Figure 3:
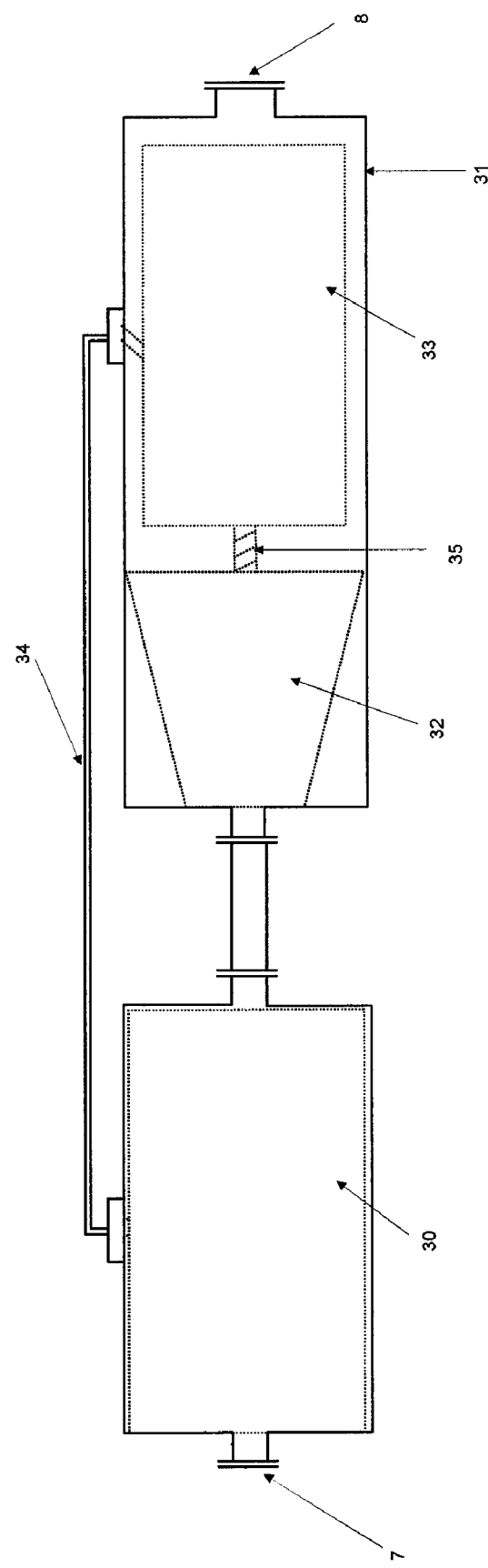
FIG. 3 is a detailed schematic diagram that depicts selected aspects illustrated in FIG. 2.

Referring to FIG. 3, there is illustrated enclosed vessel 31 housing gas expander 32 and power generator 33. Having gas expander 32 and power generator 33 in the same vessel keeps power generator 33 cooled by the expanded gas from gas expander 32.

Figure 4:
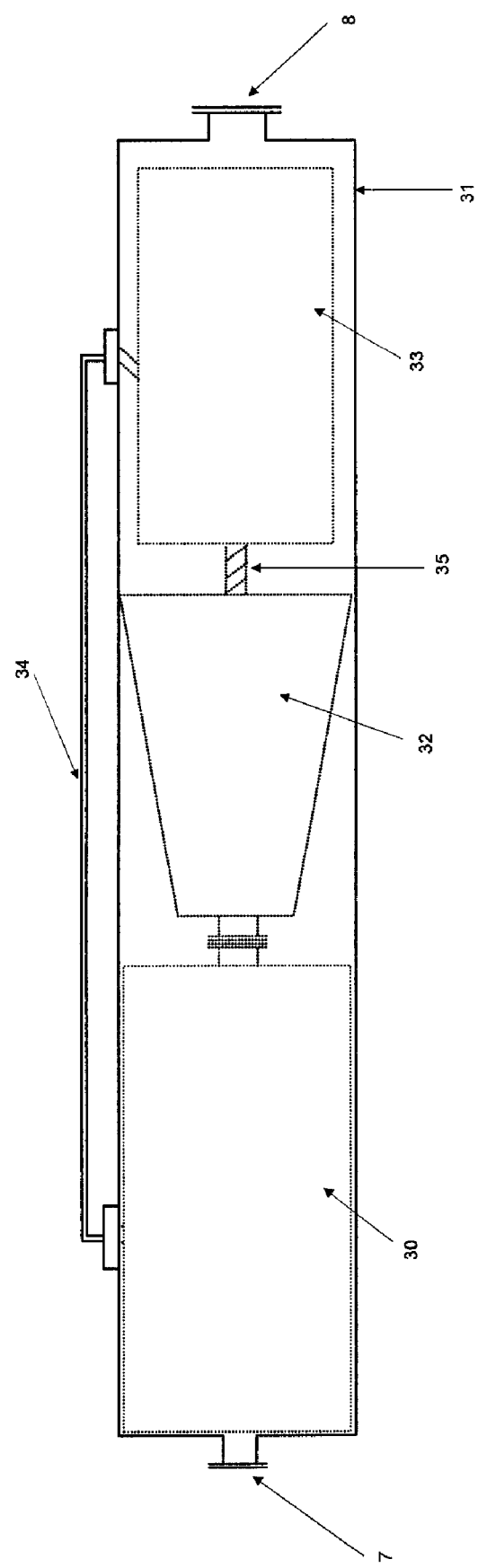
FIG. 4 is a detailed schematic diagram that depicts an alternative configuration of the selected aspects illustrated in FIG. 3.

Referring to FIG. 4, there is enclosed in vessel 31, electric heater 30, gas expander 32 and power generator 33. The containment provided by vessel 31 addresses concerns regarding the possibility of an explosion.

What is claimed is:

1. An apparatus to pre-heat gas, comprising:
   an electric line heater having electrical heating elements, wherein the electric line heater is connected to a gas inlet configured to allow gas to pass through the gas inlet, and wherein the electric line heater is configured to heat the gas as it flows through the electric line heater;
   a turbo gas expander positioned downstream of the electric line heater, wherein the turbo gas expander is configured to rotate in response to gas heated by the electric line heater that enters the turbo gas expander;
   a power generator having a rotating input shaft connected to the turbo gas expander, wherein the input shaft is configured to rotate in response to rotation of the turbo gas expander; and
   a power connection between the power generator and the electric line heater;
   wherein the power generator is configured to provide power to the electric line heater, wherein the electric line heater is configured to preheat gas flowing through the turbo gas expander to prevent formation of hydrates, wherein the rotation of the turbo gas expander is configured to provide input to power the power generator, and wherein the power generator is configured to convert the rotation of the turbo gas expander into a form of electrical energy to power the electric line heater.

2. The apparatus of claim 1, wherein the electric line heater, the turbo gas expander and the power generator are all positioned in an enclosed vessel providing containment of explosions, the gas inlet being positioned at one end of the vessel and a gas outlet at another end of the vessel, gas flowing to the outlet passing around the power generator, thereby cooling the power generator.

* * * * *